United States Patent
Lim et al.

(10) Patent No.: US 12,241,499 B2
(45) Date of Patent: *Mar. 4, 2025

(54) FASTENER JOINT AND ASSOCIATED METHOD FOR AVOIDING CORROSION OF DISSIMILAR MATERIAL FASTENER JOINTS

(71) Applicant: UT-Battelle, LLC, Oak Ridge, TN (US)

(72) Inventors: Yong Chae Lim, Oak Ridge, TN (US); Ji Heon Jun, Oak Ridge, TN (US); Michael P. Brady, Oak Ridge, TN (US); Zhili Feng, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,209

(22) Filed: Oct. 3, 2023

(65) Prior Publication Data
US 2024/0035502 A1 Feb. 1, 2024

Related U.S. Application Data

(63) Continuation of application No. 17/162,147, filed on Jan. 29, 2021, now Pat. No. 11,808,297.

(51) Int. Cl.
*F16B 5/04* (2006.01)
*C22C 38/00* (2006.01)
(Continued)

(52) U.S. Cl.
CPC ............. *F16B 5/04* (2013.01); *C22C 38/002* (2013.01); *C22C 38/005* (2013.01); *C22C 38/02* (2013.01);
(Continued)

(58) Field of Classification Search
None
See application file for complete search history.

(56) References Cited

U.S. PATENT DOCUMENTS

| 7,744,813 B2 | 6/2010 | Brady et al. |
| 7,754,144 B2 | 7/2010 | Brady et al. |

(Continued)

FOREIGN PATENT DOCUMENTS

CN 110438511 A * 11/2019

*Primary Examiner* — Anthony M Liang
(74) *Attorney, Agent, or Firm* — WARNER NORCROSS + JUDD LLP

(57) ABSTRACT

A fastener for use in joining dissimilar materials manufactured by the process of producing the fastener with an external surface that forms an electrically insulating oxide layer when subjected to oxidation and, after manufacture and prior to use, subjecting the fastener to a pre-oxidation process to grow the desired oxide layer in situ on the external surface of the fastener. The present invention also provides a dissimilar material joint in which the pre-oxidized fastener is used to mechanically join dissimilar materials with the oxide layer electrically insulating the fastener from at least one of the dissimilar materials. The fastener may be a rivet used in friction self-piercing riveting (F-SPR). The fastener may be fabricated from an alloy capable of forming $Al_2O_3$ or $Cr_2O_3$ by thermal oxidation. The fastener may be pre-coated with Al or Cr that functions as a seed layer to form $Al_2O_3$ or $Cr_2O_3$.

5 Claims, 7 Drawing Sheets

(51) Int. Cl.
  *C22C 38/02* (2006.01)
  *C22C 38/06* (2006.01)
  *C22C 38/42* (2006.01)
  *C22C 38/44* (2006.01)
  *C22C 38/46* (2006.01)
  *C22C 38/50* (2006.01)
  *C22C 38/54* (2006.01)
  *C22C 38/58* (2006.01)
  *C23C 8/14* (2006.01)
  *F16B 19/08* (2006.01)

(52) U.S. Cl.
  CPC .............. *C22C 38/06* (2013.01); *C22C 38/42* (2013.01); *C22C 38/44* (2013.01); *C22C 38/46* (2013.01); *C22C 38/50* (2013.01); *C22C 38/54* (2013.01); *C22C 38/58* (2013.01); *C23C 8/14* (2013.01); *F16B 19/086* (2013.01)

(56) References Cited

U.S. PATENT DOCUMENTS

| | | |
|---|---|---|
| 7,754,305 B2 | 7/2010 | Yamamoto et al. |
| 8,431,072 B2 | 4/2013 | Muralidharan et al. |
| 8,815,146 B2 | 8/2014 | Yamamoto et al. |
| 11,808,297 B2 * | 11/2023 | Lim .......................... C23C 8/80 |

* cited by examiner

| Material | CFRP | Steel rivet | AZ31B |
|---|---|---|---|
| Corrosion potential | $0.23V_{SCE}$ | $-0.6V_{SCE}$ | $-1.55V_{SCE}$ |

(a) Pre-fabricated fastener with selected materials (b) Oxidation process (C) Electrical insulating ceramic layer formed fastener (d) Micrograph illustrating a cross-section of the rivet

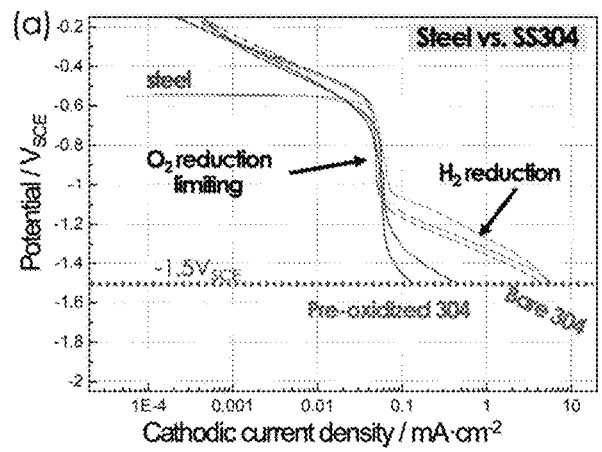 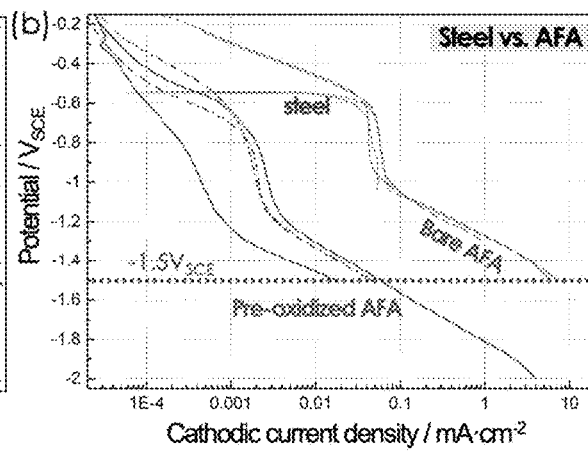
FIG. 5A      FIG. 5B
| | Cathodic current (mA, in italic fonts) and cathodic current density (mA/cm², surface area: 0.124 cm²) at -1.5V$_{SCE}$ | | | | |
|---|---|---|---|---|---|
| Material/condition | Steel | 304 | Pre-oxidized SS304 | AFA | Pre-oxidized AFA |
| Measurement #1 | *0.72* | *0.71* | *0.052* | *0.88* | *0.0055* |
| | 5.8 | 5.7 | 0.42 | 7.1 | 0.044 |
| Measurement #2 | *0.99* | *0.55* | *0.016* | *0.16* | *0.0057* |
| | 8 | 4.4 | 0.13 | 1.3 | 0.046 |
| Measurement #3 | -- | -- | -- | -- | *0.0021* |
| | | | | | 0.017 |
| Average | *0.86* | *0.63* | *0.035* | *0.52* | *0.0045* |
| | 6.9 | 5.1 | 0.28 | 4.2 | 0.036 |
FIG. 6

| Material | Pre-oxidation | Mass gain after 24-h pre-oxidation (mg/cm²) | Thickness of oxide layer | Corrosion Potential ($V_{SCE}$) | Interfacial resistance in 0.1 M NaCl at -1.5 $V_{SCE}$ (ohm-cm⁻²) |
|---|---|---|---|---|---|
| AZ31B | No | No | No | -1.55 | No |
| Steel | No | No | No | -0.6 | 15.8 |
| AFA | No | No | No | 0~0.17 | 7.2 |
| AFA | HT#2 (850°C) | (1ˢᵗ) 0.116 (2ⁿᵈ) 0.1 (3ʳᵈ) 0.11 | 300~500 nm | -0.02~0.18 | 1679 |
| SS304 | No | No | No | -0.06~0.07 | 10.4 |
| SS304 | HT#2 (650°C) | (1ˢᵗ) 9.3×10³ (2ⁿᵈ) 2.17×10² | 200~450nm | 0.01~0.08 | 174 |

| Material/condition | Carbon steel (control) | Alumina forming alloy (AFA) | | High chromium alloy (ss304) | |
|---|---|---|---|---|---|
| Pre-oxidation | No | No | Yes | No | Yes |
| Galvanic current (mA) | 2.5 | 1.38 | 0.0085 | 0.73 | 0.038 |
| Galvanic current density (mA/cm², surface area of rivet head: 0.607 cm²) | 4.12 | 2.27 | 0.014 | 1.2 | 0.063 |

| Materials/conditions | Steel rivet (control) | Pre-oxidized AFA | Pre-oxidized SS304 |
|---|---|---|---|
| Average corrosion volume measured at both sides (mm³) | 113.1945 | 40.37777 | 40.5962 |
| Average calculated galvanic current at both sides (mA) | 4.38 | 1.57 | 1.58 |

FASTENER JOINT AND ASSOCIATED METHOD FOR AVOIDING CORROSION OF DISSIMILAR MATERIAL FASTENER JOINTS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present invention relates to fastener joints, and more particularly to fastener joints involving dissimilar materials.

BACKGROUND OF THE INVENTION

Lightweight multi-materials structures have been a new concept to improve fuel efficiency and reduce green gas emission for automotive, aerospace, and other transportation applications. Higher specific strength materials, such as carbon fiber reinforced composites, aluminum alloys, magnesium alloys, and advanced ultra-high strength steels have been identified as candidate materials for automotive body and closure multi-material structures. Although joining of dissimilar materials is a critical challenge due to large differences in physical and chemical properties, another notable concern is corrosion of dissimilar joints. In particular, galvanic coupling that can form in the joints of two different materials accelerates the corrosion of anodic material in aqueous corrosive environments.

Recently, Materials Joining Group (MJG) at Oak Ridge National Laboratory (ORNL) has been focusing on the joining process development for dissimilar materials (e.g., magnesium alloy and carbon fiber reinforced polymers) for lightweight vehicle applications, supported by the DOE EERE VT office, as part of Joining Core Program. A unique solid-state joining process, called "friction self-piercing riveting (F-SPR)," was developed for the joining of high strength aluminum (Al) alloy to magnesium (Mg) alloy and carbon fiber reinforced polymer (CFRP) to Mg alloy. In the F-SPR joining process, a rotating semi-hollow rivet is plunged into the top (e.g., CFRP, or Al alloys) and bottom (e.g., Mg alloys) materials to create the final joint. Frictional heat is generated between the rotating rivet and underneath material, leading to local softening of Mg alloy. This local frictional heating can produce a crack-free joint for Mg alloy. Finally, mechanical interlocking between rivet and Mg sheet is achieved by outward flaring of the rivet leg based on the geometry of the supporting die. An exemplary F-SPR joint is shown in FIG. 1.

Furthermore, the MJG has collaborated with Corrosion Group at ORNL to study corrosion behavior of the dissimilar material joints. There are three possible corrosion mechanisms in the lap joint configuration, as shown in FIG. 1. The first one is general corrosion of individual materials, such as the rivet and Mg alloy (i.e., AZ31B), in corrosive electrolytes. The second mechanism can be crevice corrosion that can occur in the confined gap of the joint. The last one is galvanic corrosion driven by the electrical connection of two different materials, such as steel rivet to CFRP and steel rivet to AZ31B, under presence of corrosion medium. such as steel rivet to CFRP, steel rivet to Mg alloy, and carbon fibers to Mg alloy (i.e., carbon fibers→steel rivet→Mg alloy) under presence of corrosive medium, as illustrated in FIG. 1. This electrical connection is a path for galvanic current under electrolyte. In particular, Mg alloy, such as AZ31B, has corrosion potential lower than the other two materials. As a result, Mg alloy becomes an anode, while more noble material (e.g., steel rivet or CFRP) acts a cathode, leading to an accelerated corrosion of Mg alloy. FIG. 2 summarizes the measured corrosion potential of each material. In the F-SPR joint, AZ31B forms a physical contact with more noble carbon steel rivet and CFRP. Therefore, corrosion of AZ31B is accelerated by galvanic action with the steel rivet and CFRP. This galvanic corrosion is the most significant issue that should be overcome for vehicle and other transportation applications.

Mechanical fasteners, such as rivets, bolts and bits, can be coated to form a protecting layer (e.g., metallic or polymeric materials with an order of few micrometer thickness) that functions as a physical barrier and/or sacrificial anode in a corrosive environment. However, local or partial delamination of the coating layer on the fasteners during mechanical or solid-state joining processes, such as self-piercing riveting and F-SPR, has been an issue due to interaction with joining materials and tool holder. Another issue is that metallic coating on the fasteners can produce a complex galvanic circuit which could produce a risk of enhanced galvanic corrosion of Mg alloys. Next issue for polymeric coating material can be relatively low melting temperature than the temperature generated during joining process. In addition, relatively higher wear rate is an issue during joining process.

A ceramic coating on fasteners can be an alternative solution to address the above issues due to following reasons, such as good corrosion resistance, low wear rate, and high temperature endurance. Plasma spray coating is the most well-known technique for ceramic coating of relatively large and simple shape by manually or automated manner. Also, another technique, such as chemical vapor deposition, can be applied, but high vacuum and clean environment are required. However, none of above techniques can be easily applied to complex and small fasteners. Also, mass volume production at low cost is a critical issue. As a result, there remains a long felt and unmet need for a fastener joint and associated method for joining dissimilar materials.

SUMMARY OF THE INVENTION

The present invention provides a fastener for use in joining dissimilar materials in which galvanic corrosion is a concern where the exterior surface of the fastener includes an adherent, electrically insulating oxide layer grown in place on the surface of the fastener in a pre-oxidation process. The oxide layer may be essentially any oxide in an electrically resistive phase, such as an aluminum oxide (e.g. $Al_2O_3$), a chromium oxide (e.g. $Cr_2O_3$), a silicon oxide (e.g. $SiO_2$) and/or an aluminum nitride in a resistive phase (e.g. AlN), that once grown in place on the fastener is sufficiently adherent to be retained on the fastener during the associated fastening process. The oxide layer is of sufficient thickness to provide the desired level of electrical insulation along the interface between the fastener and the joined materials, but not so thick as to give the oxide layer a tendency to separate from the fastener during the joining process. The oxide layer may be $Al_2O_3$, $Cr_2O_3$ or $SiO_2$ based; a mixture among these oxides; or also contain other oxides of the base metal (e.g. Fe, Ni, Mn) inter mixed with the $Al_2O_3$, $Cr_2O_3$, and/or $SiO_2$.

In one embodiment, the fastener is fabricated and then pre-oxidized to grow the insulating surface layer in-situ. The oxide (or nitride) layer may be formed by thermal or electrochemical oxidation, open air plasma, laser treatment, nitridation or any other oxidation process capable of growing an adherent, electrically insulating oxide layer in place on the surface of the fastener.

In one embodiment, the fastener is fabricated from a material that forms an insulating oxide layer when subjected to thermal oxidation, such as aluminum oxide ($Al_2O_3$), chromium oxide ($Cr_2O_3$), silicon oxides ($SiO_2$) or aluminum nitrides (AlN). After fabrication of the fastener and prior to use, the fastener is subjected to thermal oxidation to form the desired oxide layer. The thermal oxidation process may occur in the presence of oxygen, for example, in atmospheric air, but it may also occur in the presence of auxiliary gases.

In one embodiment, the fastener may be a rivet, bolt, screw, bit, pin or other fastener. In one embodiment, the fastener may be a rivet used in friction self-piercing riveting (F-SPR), which will require the oxidation layer to withstand high temperatures and be highly wear resistant.

In one embodiment, the fastener is fabricated from an alloy that grows an electrically insulating oxide layer when the fastener is subjected to pre-oxidation. For example, the fastener may be fabricated from an alloy that will form $Al_2O_3$ or $Cr_2O_3$ when subjected to an oxidation process, such as thermal oxidation. In alternative embodiment, the fastener may be pre-coated with a material that functions as a seed layer for the oxide layer. For example, the fastener may be coated with Al or Cr that functions as a seed layer to form $Al_2O_3$ or $Cr_2O_3$ when subjected to oxidation, such as thermal oxidation. In applications that involve a pre-coating, the pre-coating may be applied to the fastener using conventional methods at any time prior to the oxidation process.

In one embodiment, the fastener is manufactured from an alumina-forming alloy. One example includes alumina-forming austenitic (AFA) steel, which was developed at Oak Ridge National Labs. For example, the fastener may be manufactured from an AFA-type alloy having the following general composition ranges: (12-35)Ni; (12-25)Cr; (2-6)Al; (0-3)Cu; (0.3-4)Nb; (0-12)Mn; (0-2)Mo; (0-2)W; (0.1-1.5)Si; (0-3)Ti; (0-0.5)V; (0-0.5)C; (0.005-0.15)B; (0-0.1)P; (0.0.5)Hf; (0-0.5)Zr; (0-0.2)Y; balance Fe to 100 wt. %. As another example, the fastener may be formed from any iron-chromium-aluminum (FeCrAl)-base alloy that has been well established to exhibit high-temperature corrosion resistance through formation of $Al_2O_3$-base films. For example, the fastener may be manufactured from an FeCrAl-type alloy having the following general composition ranges: (8-25)Cr; (2-6)Al; (0-0.5)Hf; (0-0.5)Zr; (0-0.2)Y; balance Fe to 100 wt. %.

In one embodiment, the fastener may be manufactured from a chromia-forming alloy, such as a chromia-forming stainless steel that has been well established to offer excellent high temperature corrosion resistance through formation of $Cr_2O_3$-base films, although $Cr_2O_3$-base films are generally not as electrically insulating as $Al_2O_3$. For example, the fastener may be fabricated from SS304 austenitic stainless steel, such as SS304L having the following general composition ranges: (18-20)Cr; (8-12)Ni; (2 Max) Mn; (0.75 Max)Si; (0.1 Max)N; (0.03 Max)C; balance Fe to 100 wt. %. There are a broad range of other austenitic and ferritic grades of stainless steel that can form $Cr_2O_3$-based surfaces. Generally, any stainless steel or related alloy that contains about 9 to 30 wt. % Cr may be capable of forming a $Cr_2O_3$ based oxide on thermal oxidation.

The characteristics of the oxide layer, such as thickness and mass gain, may vary from application to application depending on the desired electrical insulating and adherence properties of the oxide layer as grown in place on the base material. These may vary, in part, based on the materials being joined, the type of fastener and the type of joining process. For example, some materials have greater potential for corrosion and may benefit from increased electrical insulation, some joining processes may involve higher heat and therefore benefit from an oxide that is more heat tolerant and some joining processes may subject the fastener to more wear and may therefore be enhanced by an oxide layer that is more wear resistant. In one embodiment, the fastener is a rivet intended for use in a friction-self piercing rivet ("F-SPR") joint. In this context, the oxidation layer has a thickness in the range of about 20 nm to about 2000 nm, or in the range of about 50 nm to about 1000 nm or in the range of about 100 nm to about 500 nm and the mass gain after thermal air oxidation may be the range of about 0.01 to about 0.5 $mg/cm^2$, or in the range 0.05 to 0.2 $mg/cm^2$. In F-SPR joints, thinner layers are anticipated to provide inadequate electrical isolation and thicker layers may result in spallation risk and poor joining.

Oxidation processing conditions, such as heating temperature, heating rate, holding time and cooling time, may be selected based on the composition of the material and the associated joining process. More specifically, in one embodiment, the general goal may be to grow an oxide layer that is thick enough to provide electrical insulation, but thin enough to remain adherent and survive the associated joining process. For example, with alumina-forming alloys, the fastener may be heated to between about 600° C. to about 1200° C. for a period of about 5 minutes to about 24 hours. As another example, with chromia-forming alloys, the fastener may be heated to between about 500° C. to about 900° C. for a period of about 5 minutes to about 24 hours.

In another aspect, the present invention provides a method for forming a mechanical fastener intended for use in joining dissimilar materials that are prone to galvanic corrosion, including the steps of fabricating a fastener from an electrically conductive material and then pre-oxidizing the fastener to grow an adherent, electrically insulating oxide layer in-situ on the exterior surface of the fastener. The oxide layer may be essentially any oxide in an electrically insulating phase, including, for example, an aluminum oxide (e.g. $Al_2O_3$), a chromium oxide (e.g. $Cr_2O_3$), a silicon oxide (e.g. $SiO_2$) and/or an aluminum nitride in a resistive phase (e.g. AlN). In one embodiment, the oxide layer is grown in an oxidation process in the presence of oxygen. In one embodiment, the oxidation process is thermal oxidation, electrochemical oxidation or nitridation. In one embodiment, the oxide layer is grown to a thickness of about 20 nm to about 2000 nm, or in the range of about 50 nm to about 1000 nm or in the range of about 100 nm to about 500 nm. As another example, in some applications, the mass gain after oxidation may be the range of 0.01 to 0.5 $mg/cm^2$, or in the range 0.05 to 0.2 $mg/cm^2$.

In another aspect, the present invention provides a method for protecting a dissimilar material joint from galvanic corrosion including the steps of fabricating a fastener from an electrically conductive material, pre-oxidizing the fastener to grow an adherent, electrically insulating oxide layer on the exterior surface of the fastener, joining a first material to a second material with the fastener where the first material and the second material have different corrosion potentials and the interface between the fastener and at least one of the two materials is electrically insulated by the oxide layer. In this method, the oxide layer may be essentially any oxide in an electrically insulating phase, including, for example, an aluminum oxide (e.g. $Al_2O_3$), a chromium oxide (e.g. $Cr_2O_3$), a silicon oxide (e.g. $SiO_2$) and/or an aluminum nitride in a resistive phase (e.g. AlN).

In some embodiments of this method, the fastener is fabricated from an alloy that grows an electrically insulating oxide layer when subjected to pre-oxidation. For example, the fastener may be fabricated from an alloy that will form $Al_2O_3$ or $Cr_2O_3$ when subjected to an oxidation process, such as thermal oxidation. In other embodiments of this method, the fastener is pre-coated with a material that functions as a seed layer for the oxide layer. For example, the fastener may be coated with Al or Cr that functions as a seed layer to form $Al_2O_3$ or $Cr_2O_3$ when subjected to oxidation, such as thermal oxidation.

In yet another aspect, the present invention provides a method for forming an electrically insulating oxide layer on the external surface of a mechanical fastener during a friction or heat-based joining process. In one embodiment, the method includes the step of fabricating the fastener from a material that will form an electrically insulating oxide layer when subjected to a thermal treatment. In one embodiment, the method includes the step of controlling the parameters of the heat-based joining process so that the fastener is subjected to thermal conditions that cause the desired oxide layer to be grown in place on the fastener during the joining process.

The present invention provides a joint assembly for joining dissimilar materials that significantly reduces galvanic corrosion and is suitable for use in high temperature and high wear applications. The joint assembly incorporates a fastener having an electrically insulating oxide layer that reduces the galvanic current density between the first material and the fastener and between the second material and the fastener. The pre-oxidation process of the present invention is capable of reliably growing an adherent, electrically insulating oxide layer on small and complex shapes. The process is relatively inexpensive to perform, particularly when compared with plasma spray coating and chemical vapor deposition processes that have been used to adhere, rather than grow in place ceramic layers. In one embodiment of the present invention, mass volumes of pre-fabricated fasteners can be heat treated in air to self-form the insulating oxide layer on fastener surfaces as part of the joining process, such as F-SPR, or friction bit joining, ultrasonic rivet bonding. This can make the approach low cost compared to conventional coating methods and amenable to mass scale production.

The present invention makes it possible to provide a fastener for use in joining dissimilar materials that, in some embodiments, presents the following characteristics, individually, in combination or in any subcombination:

Increases 10~10,000 times interfacial resistance to cathodic reactions than joining pieces without surface insulation layer;

Provides up to 99% reduction in galvanic current density for Mg alloy in a simple galvanic coupling without joining compared to carbon steel fastener;

Has adequate adhesion, wear resistance and high temperature endurance to prevent delamination issues during many types of joining processes; and Yields electrical insulating oxide layer thickness ranging from about 50 nm to about 1000 nm or about 100 nm to about 500 nm, resulting from optimized thermal oxidation processes.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 5A is a graph comparing cathodic polarization curves for steel and SS304.

FIG. 5B is a graph comparing cathodic polarization curves for steel and AFA.

FIG. 6 is a table summarizing the cathodic current density at $-1.5$ $V_{SCE}$ for carbon steel, SS304 (before and after pre-oxidation) and AFA (before and after pre-oxidation.

DESCRIPTION OF CURRENT EMBODIMENTS

Figure 3:
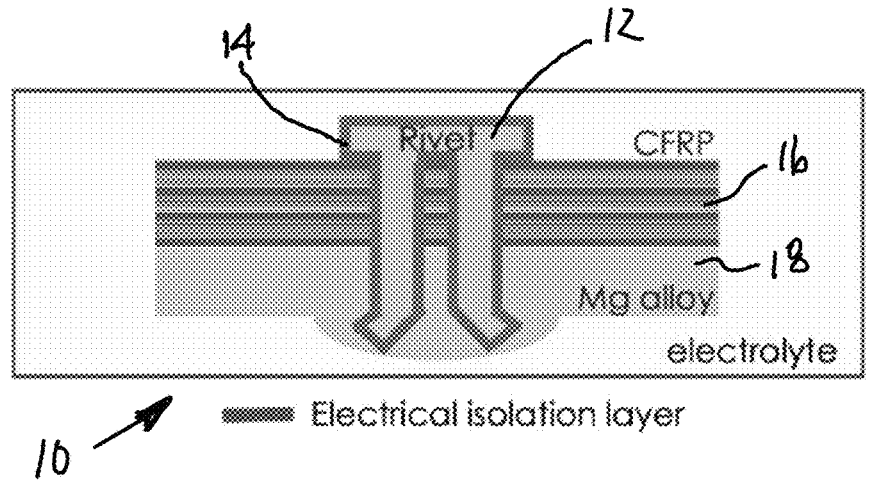
FIG. 3 is an illustration of a friction self-piercing rivet joint in accordance with an embodiment of the present invention.
Figure 4:
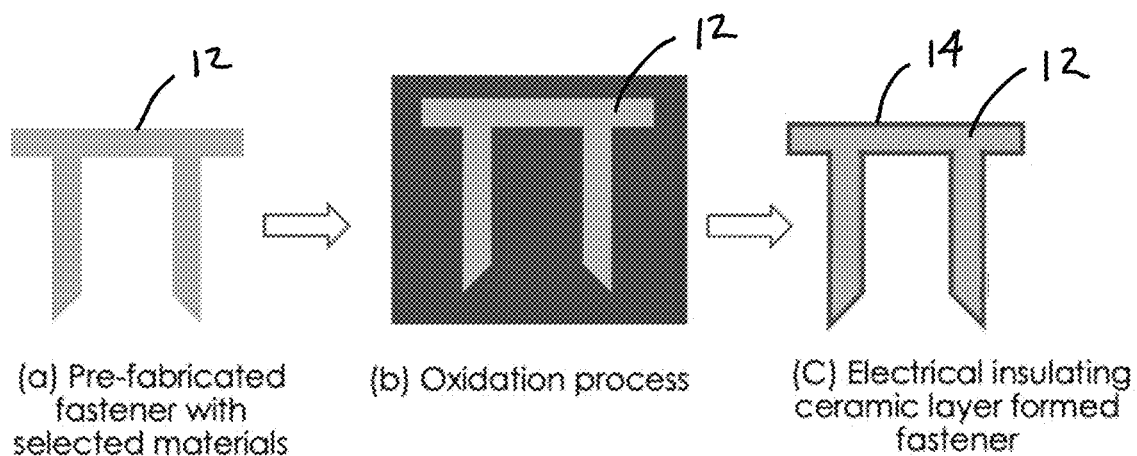
FIG. 4 is a series of representative illustrations showing the fastener manufacturing process of the present invention, as well as enlarger representative illustration of an oxide layer on the surface of the fastener.
Figure 4:
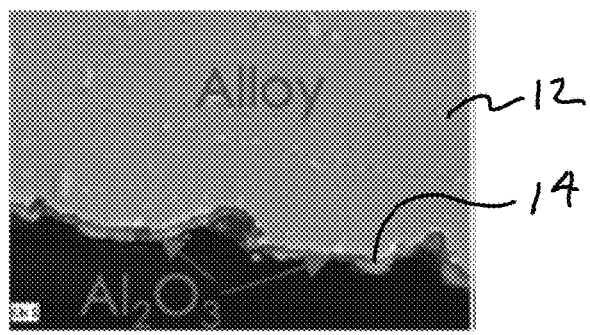

The present invention provides a fastener 12 for use in joining dissimilar materials, a method for manufacturing a fastener 12 for use in joining dissimilar materials and a multi-material joint 10 including dissimilar materials joined by a fastener 12 in accordance with an embodiment of the present invention. Referring to FIGS. 3 and 4, the various aspects of the present invention are associated with a fastener 12 having an external surface that includes an adherent, electrically insulating oxide layer 14 that was grown in place on the surface of the fastener 12 in a pre-oxidation process. As will be appreciated from the description herein, the fastener 12 may be referred to as the "bare fastener" prior to the pre-oxidation process and subsequently as the "pre-oxidized fastener" following the pre-oxidation process. The oxide layer 14 may include essentially any oxide in an electrically resistive phase, such as an aluminum oxide (e.g. $Al_2O_3$), a chromium oxide (e.g. $Cr_2O_3$), a silicon oxide (e.g. $SiO_2$) and/or an aluminum nitride in a resistive phase (e.g. AlN), that once grown in place on the fastener 12 is sufficiently adherent to be retained by the fastener 12 during the associated fastening process. The oxide layer 14 is of sufficient thickness to provide the desired level of electrical insulation along the interface between the fastener 14 and the joined materials 16 and 18, but not so thick as to give the oxide layer 14 a tendency to separate from the fastener 12 during the joining process. It is to be appreciated that growing the oxide in place on the fastener in a pre-oxidation process has the potential to provide a more adherent layer than is provided when an oxide layer is adhered to the surface of the fastener using conventional adhering processes. Oxides layers that are adhered to the surface of the fastener, rather than grown in place, will generally have a greater tendency to fracture and separate from the fastener or otherwise fail during the joining process. This fracturing, separation or failure could result in an increase in electrical conductive within the joint, which in turn may result in greater galvanic corrosion.

Figures 1, 2:
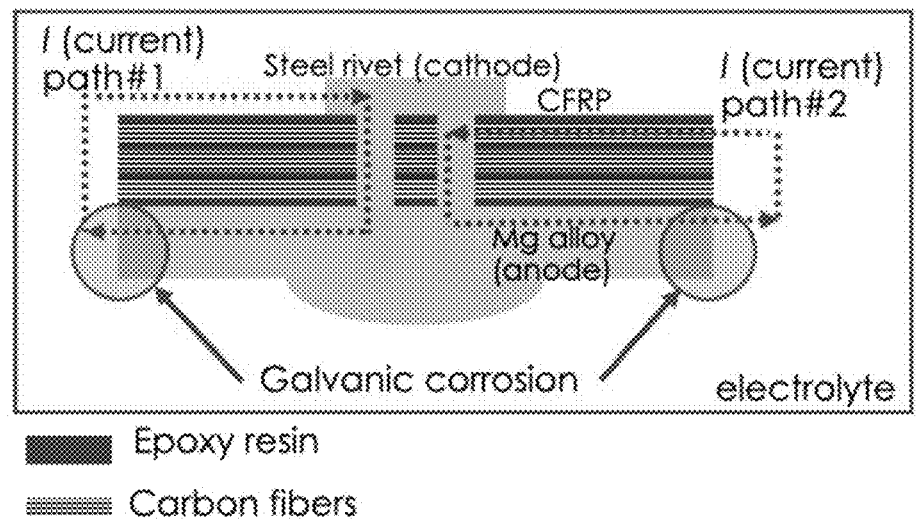
FIG. 1 is an illustration of a conventional multi-material joint that is joined by a friction self-piercing-rivet.
FIG. 2 is a table summarizing the corrosion potential of CFRP, steel rivet and AZ31B of the multi-material joint of FIG. 1.

FIG. 1 is a schematic cross-section of a generally conventional multi-material F-SPR joint in which a carbon fiber reinforced polymer ("CFRP") layer is joined to a magnesium alloy ("Mg alloy") layer by a rivet. FIG. 1 shows possible galvanic current paths for different galvanic couples in this conventional F-SPR joint. One possible current path is through a galvanic couple between the steel rivet and the Mg alloy. Another possible current path is through a galvanic couple among carbon fibers, the steel rivet and the Mg alloy. The circles indicate the general contact locations of dissimilar materials where galvanic corrosion can prevail under electrolyte exposure. FIG. 2 is a table summarizing the corrosion potential of CFRP, a steel rivet and a Magnesium alloy (AZ31B). The corrosion potential of these materials was measured using a reference saturated calomel electrode ("SCE"). As can be seen, these materials have substantial potential for galvanic corrosion. FIG. 1 shows a CFRP layer joined to a Mg alloy layer, but it is not uncommon for multi-material F-SPR joints to involve the joining of other materials, such as joining an aluminum alloy ("Al alloy") layer to a Mg alloy layer. It is also not uncommon for F-SPR joints to include more than two layers. It should be further noted that the F-SPR joint of FIG. 1 is merely an example intended to assist in understanding the concepts of galvanic corrosion associated with dissimilar joints. Similar concerns are associated with a wide range of different types of dissimilar joints that utilize fasteners to adjoin two or more layers of with different corrosion potentials, such as ultrasonic rivet joining, friction bit joining, self-piercing rivet and a range of conventional mechanical fastener joints.

For purposes of disclosure, the present invention is described in the context of a rivet 12 used to join dissimilar materials 16 and 18 in a friction self-piercing rivet ("F-SPR") joint 10 that is similar to the F-SPR joint shown in FIG. 1. FIG. 3 is schematic cross section of an F-SPR joint incorporating a fastener 12 in accordance with an embodiment of the present invention. In this embodiment, the joint 10 includes an F-SPR rivet 12 joining a layer of carbon fiber reinforced polymer ("CFRP") and a layer of magnesium alloy ("Mg alloy"). It should be understood, however, that dissimilar joint 10 is merely exemplary. The present invention is not limited to rivets, but may instead be implemented with other types of fasteners, such as bits, bolts, screws, pins and mechanical fasteners of other shapes. Further, the present invention is not limited to F-SPR joints or to joints that involve CFRP and Mg alloy layers, but instead may be incorporated into other types of multi-material joints that include different joining processes and/or the joining of different materials where galvanic corrosion is a concern. Additionally, the present invention is not limited to joints that involve two materials, but may be implemented in joints that include three or more layers.

Referring again to FIG. 3, the rivet 12 of the illustrated embodiment includes an electrically insulating oxide layer 14 that was grown in place on the external surface of the rivet 12. Although FIG. 3 shows the oxide layer 14 covering the exterior of the rivet 12, the oxide layer 14 may, in alternative embodiments, extend over only portions of the external surface of the rivet 12. For example, the oxide layer 14 may in some alternative applications be formed only on portions of the rivet 12 that will mate with one or both of the materials being joined. The oxide layer 14 may include essentially any oxide in an electrically resistive phase, such as an aluminum oxide (e.g., $Al_2O_3$), a chromium oxide (e.g., $Cr_2O_3$), a silicon oxide (e.g., $SiO_2$) and/or an aluminum nitride in a resistive phase (e.g., AlN). Oxides, such as $Al_2O_3$, $Cr_2O_3$ and $SiO_2$, are sufficiently electrically insulating and can be grown on alloys by relatively low-cost oxidation processes. In some applications, the oxide layer 14 may include more than one type of oxide. For example, chromia-forming alloys commonly contain Si, which may form local $SiO_2$ at the alloy-oxide interface in addition to the outer $CrO_3$ layer.

FIG. 4 is an illustration of the general fastener manufacturing method employed in one embodiment of the present invention. In this embodiment, the method includes the steps of forming the rivet 12 from an oxide-forming alloy (See FIG. 4, Stage (a)) and then subjected the rivet 12 to an oxidation process (See FIG. 4, Stage (b)) to grow the oxide layer 14 (See FIG. 4, Stage (c)) on the outer surface of the rivet 12 prior to use in the F-SPR joint 10. FIG. 4(d) is an enlarged micrograph illustrating a cross-section of a portion of the rivet 12 showing a layer of aluminum oxide 14 that was grown on the surface of the rivet 12 during the oxidation process of FIG. 4, Stage (b). It should be noted that a layer of aluminum oxide 14 is shown in FIG. 4(d) only as an example, and that the oxide layer may be essentially any oxide in an electrically insulating phase. Similarly, FIG. 4 shows the manufacture of a rivet intended for use in an F-SPR joint 10, but the method may be used with other types of fasteners.

The rivet 12 (or other fastener) may be fabricated using essentially any known manufacturing technique. For example, the rivet 12 may be fabricated using any suitable cold or hot forming process. In the illustrated embodiment, the rivet 12 is fabricated so that it is capable of growing an electrically insulating oxide layer in-situ on the external surface when the rivet 12 is subjected to an oxidation process. For example, the rivet 12 may be manufactured from an alloy that is capable of growing the desired oxide layer when the rivet 12 is subjected to pre-oxidation (e.g. an oxidation process occurring after formation of the rivet 12, but before use in the joining process). In embodiments of this type, the rivet 12 may be of a one-piece unitary construction in which the entire rivet 12 is formed of an oxide forming material. As an alternative to fabricating the entire rivet 12 from an oxide forming material, the rivet 12 may be fabricated from a material that is not oxide forming, but has been pre-coated with a material that functions as a seed layer to grow the oxide during pre-oxidation of the rivet 12. The pre-coating may be applied to the entire external surface of the rivet 12 or only to select portions of the external surface.

In one exemplary embodiment, the rivet 12 is manufactured from an alumina-forming alloy. There are a wide range of commercially available alloys that can form $Al_2O_3$ oxide layer when subjected to an oxidation process. It should be noted that minor portions of other alloy elements can also be present in the oxide surface. One suitable alumina-forming alloy includes alumina-forming austenitic (AFA) steel, which was developed at Oak Ridge National Labs. For example, the fastener may be manufactured from an AFA-type alloy having the following general composition ranges: (12-35)Ni; (12-25)Cr; (2-6)Al; (0-3)Cu; (0.3-4)Nb; (0-12)Mn; (0-2)Mo; (0-2)W; (0.1-1.5)Si; (0-3)Ti; (0-0.5)V; (0-0.5)C; (0.005-0.15)B; (0-0.1)P; (0.0.5)Hf; (0-0.5)Zr; (0-0.2)Y; balance Fe to 100 wt. %. In one embodiment, the fastener may be manufactured from an AFA alloy having the following composition in wt. %, based on total weight of composition: (51.1)Fe; (14.0)Cr; (2.0)Mn; (25.0)Ni; (0.5)Cu; (3.0)Al; (0.15)Si; (1.0)Nb; (0.05)V; (0.05)Ti; (2.0)Mo; (1.0)W; (0.10)C; (0.01)B; (0.02)P ("AFA OC5"). Other exemplary AFA alloys that may be suitable for use with the present invention are set forth in U.S. Pat. Nos. 7,744,813; 7,754,144; 7,754,305; 8,431,072 and 8,815,146, which are incorporated herein by reference in their entirety. As another example of an alumina-forming alloy, the rivet 12 may be formed from any iron-chromium-aluminum (FeCrAl)-base alloy that has been well established to exhibit high-temperature corrosion resistance through formation of $Al_2O_3$-base films. For example, the rivet 12 may be manufactured from an FeCrAl-type alloy having the following general composition ranges: (8-25)Cr; (2-6)Al; (0-0.5)Hf; (0-0.5)Zr; (0-0.2)Y; balance Fe to 100 wt. %. In one embodiment, the fastener may be fabricated from a stainless steel alloy having the following composition: (18-20)Cr; (8-12)Ni; (2 Max)Mn; (0.75 Max)Si; (0.1 Max)N; (0.03 Max)C; balance Fe to 100 wt. % ("SS304L"). There are also Ni-based alloys that are known to form alumina in response to oxidation, but Ni-based alloys can be more costly.

In alternative embodiments, the fastener may be manufactured from a chromia-forming alloy. There are many commercially available austenitic and ferritic grades of stainless steel that form $CrO_3$-based oxide surfaces. Many of these chromia-forming stainless steel alloys have been well established to offer excellent high temperature corrosion resistance through formation of $Cr_2O_3$-base films, although $Cr_2O_3$-base films are generally not as electrically insulating as $Al_2O_3$. For example, the fastener may be fabricated from an SS304 austenitic stainless steel, such as SS304L. There are a broad range of other austenitic and ferritic grades of stainless steel that can form $Cr_2O_3$-based surfaces. While stainless steels are Fe-based, there are also known Ni-based alloys that can form $CrO_3$-based surface oxides (though the high Ni content may make them more costly). Generally, any stainless steel or related alloy that contains about 9 to 30 wt. % Cr may be capable of forming a $Cr_2O_3$ based oxide on thermal oxidation.

As noted above, the oxide layer is grown on the external surface of the rivet 12 in a pre-oxidation process (e.g. an oxidation process that occurs after initial fabrication of the rivet 12, but before use in joining). Growing the oxide layer in place on the surface of the rivet 12 yields an adherent oxide layer that, if of appropriate thickness, is capable of remaining intact on the rivet 12 even in joining processes that involve high temperature and high wear operations, such as F-SPR joints. In typical applications, the oxide layer 14 may have a thickness in the range of about 20 nm to about 2000 nm, or in the range of about 50 nm to about 1000 nm or in the range of about 100 nm to about 500 nm. However, the thickness may vary from application to application depending on the physical properties of the oxide layer, the fastener, the materials being joined and the associated joining process. For example, increased thickness may be employed when increased electrical insulation is more important than increased adherence. This may be desirable in applications where the joining process is not particularly harsh (e.g. lower temperature, less friction, less wear).

The oxide layer 14 may be grown on the surface of the rivet 12 by essentially any oxidation process, such as thermal oxidation, electrochemical oxidation or nitridation. In typical applications, the oxidation process will take place in an oxygen containing environment. The oxidation processing conditions may vary from application to application depending, in part, on the material used to form the rivet 12 or to seed the rivet 12 and the desired oxidation layer thickness. Oxidation process conditions, such as temperature, heating rate, heating time, holding time, cooling time and the possible use of auxiliary gases, are determined to provide an oxide layer with the desired properties, particularly adherence, electrical insulation, wear resistance and corrosion resistance properties.

By way of example, the rivet 12 may in some embodiments be fabricated from, or pre-coated with a seed layer of, an alumina-forming material or a chromia-forming material. In such embodiments, the rivet 12 is subjected to pre-oxidation after initial fabrication. For example, the rivet 12 may undergo a thermal oxidation process after it is formed, but prior to its use in a joining process. In this context, the thermal oxidation step forms a layer of oxide 14, either aluminum oxide or chromium oxide, that grows in-situ on the outer surface of the pre-formed rivet 12. It should be understood that aluminum oxide and chromium oxide are merely exemplary and the present invention may be implemented with other types of oxide layers that are electrically insulative.

In the general method shown in FIG. 4, the rivet 12 is subjected to an oxidation process performed in the presence of oxygen, such as in the presence of environment air. In one example, the oxidation process includes a thermal treatment that is carried out under processing conditions selected to grow an oxide layer of the desired characteristics on the exposed surface of the rivet 12. The oxidation processing conditions are selected to grow an oxide layer 14 of sufficient thickness to provide sufficient electrical insulation, but not so thick as to make the oxide layer 14 susceptible to spallation, delamination or other defects. In the context of a rivet 12 used in an F-SPR joining process, the goal is to grow an oxide layer thick enough to get an electrical insulation effect but thin enough to stay adherent and survive the rivet joining process without breaking apart and losing electrical insulation or resulting in a poor joint. For example, and as noted above, the oxide layer may in the context of this example have a thickness in the range of about 20 nm to about 2000 nm, or in the range of about 50 nm to about 1000 nm, or in the range of about 100 nm to about 500 nm. In some applications, the mass gain after oxidation may be the range of 0.01 to 0.5 mg/cm$^2$, or in the range 0.05 to 0.2 mg/cm$^2$.

The oxidation processing conditions may vary from application to application, and may be selected based in part on the specific alloy involved. For example, oxidation process conditions, such as oxidation temperature, heating rate, holding time and cooling time, may vary based on one or more of the material used to form the rivet 12 (or to seed the rivet 12), the type of oxide layer 14 to be formed, the desired level of electrical resistivity, the desired adherence and the desired oxide layer thickness. In one example, a rivet 12 fabricated from AFA OC5 alloy is heated to 800° C. and held at 800° C. for 24 hours in air. In another example, a rivet 12 fabricated from SS304L alloy is heated to 600° C. and held at 600° C. for 24 hours in air. However, these processing conditions are merely exemplary. When oxidizing alumina formers, a general temperature range of about 600° C. to about 1200° C. is of interest, with a temperature range of about 800° C.-1100° C. being of more interest depending on the specific alloy. When oxidizing alumina formers, the heating time may be in the range of about 5 minutes to about 24 hours, and in some applications in the range of about 1 hour to 8 hours. Besides air, the oxidation process can also be implemented in low oxygen partial pressure environments, such as Ar—H$_2$—O$_2$ (also CO$_2$, CO$_2$—H$_2$, and related mixtures) to favor more exclusive Al$_2$O$_3$ formation and minimize incorporation of other alloy addition element oxides.

When oxidizing chromia formers, the heating temperatures may be lower due to more rapid growth rate of Cr$_2$O$_3$ vs Al$_2$O$_3$. For example, when oxidizing a fastener fabricated form a chromia former, the heating range may be about 500° C. to about 900° C., or about 600° C. to about 800° C. The heating time may again be in the range of about 5 minutes to about 24 hours, and in some embodiments in the range of about 1 hour to 8 hours. Similarly to that described for Al$_2$O$_3$, air or low oxygen partial pressure gas mixtures can be used.

In one aspect, the present invention discloses a joint design employing an electrically insulating oxide layer grown in place on the rivet surfaces by an oxidation process to reduce galvanic corrosion through an electrical insulation at joint interface between Mg alloy and mechanical fastener (e.g., rivet). The fastener is pre-processed to self-form an insulating surface layer that is characterized by one or more of the following: 10~10,000 times higher interfacial resistance to cathodic reactions than conventional materials to significantly reduce cathodic reaction (when measured at −1.5 V$_{SCE}$ in a 0.1 M NaCl solution); up to 99% reduction in galvanic current density for Mg alloy in a simple galvanic coupling without joining compared to carbon steel fastener; good adherence and wear resistance to prevent delamination during joining process; high temperature excursion tolerance during joining process; good corrosion resistance (atmospheric and aqueous salt solutions); and large volume production capability. In some embodiments, the pre-oxidized fastener, when measured at −1.5 V$_{SCE}$ in a 0.1 M NaCl solution, exhibits at least 10 times higher interfacial resistance than the bare fastener (or carbon steel fastener), alternatively 100 times higher interfacial resistance than the bare fastener (or carbon steel fastener), alternatively 1,000 times higher interfacial resistance than the bare fastener (or carbon steel fastener), and alternatively 10,000 times higher interfacial resistance than the bare fastener (or carbon steel fastener). In some embodiments, the pre-oxidized fastener exhibits 99% lower galvanic current density than the bare fastener (or carbon steel fastener), alternatively 95% lower galvanic current density than the bare fastener (or carbon steel fastener), alternatively 75% lower galvanic current density than the bare fastener (or carbon steel fastener), and alternatively 50% lower galvanic current density than the bare fastener (or carbon steel fastener). As noted above, FIG. 3 illustrates an example of the present invention using an electrically insulating oxide layer on a mechanical fastener in an F-SPR joint joining dissimilar materials (e.g., CFRP and Mg alloy). The present invention can be applied to other dissimilar material pairs (2T), such as aluminum (Al) alloy to steel, Al alloy to Mg alloy, Al alloy to CFRP, steel to CFRP, or to joints that include more than two layers (>2T).

In one aspect, the invention is directed to a mechanical fastener for friction-based joining (e.g., F-SPR rivet) having an insulating and adherent oxide ceramic layer, such as aluminum oxide (e.g. Al$_2$O$_3$), a chromium oxide (e.g. Cr$_2$O$_3$), a silicon oxide (e.g. SiO$_2$) and/or an aluminum nitride in a resistive phase (e.g. AlN). The oxide layer is grown in place on the surface of the fastener by oxidation processing, such as thermal oxidation, electrochemical oxidation or nitridation, of the fastener prior to friction based joining, with the result that the oxide layer is maintained and electrically isolates the fastener material from the joint, thus reducing galvanic corrosion. The mechanical fastener materials may be selected from among Al alloys and Al or Cr containing alloys such as stainless steels, FeCrAl alloys, alumina-forming austenitic stainless steels that form an electrically insulating Al$_2$O$_3$, AlN, Cr$_2$O$_3$ layer on the fastener surface during thermal or electrochemical oxidation processes. As noted above, the mechanical fasteners, such as a rivet, bit, bolt, or other shape, can be pre-fabricated by cold or hot forming processes prior to oxidation processing. Both thermal oxidation processing with local surface temperatures in excess of 600° C. and electrochemical oxidation processing via techniques, such as anodization, are viable. The thermal oxidation can be achieved by heating of the entire fastener in a furnace, or local surface heating by open air plasma or laser techniques.

In one embodiment, the fastener is fabricated from an alloy that can from Al$_2$O$_3$ or Cr$_2$O$_3$ by thermal oxidation or pre-coated with Al or Cr or Al+Cr that functions as a seed layer to form Al$_2$O$_3$ or Cr$_2$O$_3$ (i.e., composite layer). After fabrication, the fastener undergoes an oxidation process to grow an insulating Al$_2$O$_3$ or AlN or Cr$_2$O$_3$ based ceramic layer (shown in FIG. 3) on the fastener surface that functions as an electrically insulating layer for galvanic corrosion protection. Ranges of oxide thickness from thermal or electrochemical oxidation treatment in this embodiment could be from about 10 nm to about 500 nm. In the context of this embodiment, thinner layers are anticipated to provide inadequate electrical isolation and thicker layers may result in spallation risk and poor joining. In this embodiment, mass gains after thermal air oxidation would be in a range from about 0.01 to about 0.5 mg/cm$^2$ or in the range 0.05 to 0.2 mg/cm$^2$; resistance to cathodic reaction (i.e., interfacial resistance) would be 10~10,000 times higher than the conventional carbon steels when measured at −1.5 $V_{SCE}$ in a 0.1 M NaCl solution; up to 99% reduction in galvanic current density for Mg alloy in a simple galvanic coupling without joining compared to carbon steel fastener.

Alternatively, pre-fabricated fasteners can be heat treated in air to self-form the insulating oxide layer on fastener surfaces as part of a friction based joining process (i.e., in-situ oxide layer forming during joining), such as F-SPR, FBJ, ultrasonic rivet bonding. In addition, electrical insulated mechanical fasteners by this approach can be also used for conventional mechanical fastening methods. This can make the approach low-cost compared to conventional coating methods and amenable to mass scale production.

In an exemplary test of the present invention, a potentiodynamic technique was used to investigate cathodic current transients for carbon steel (as control), bare AFA (i.e., not pre-oxidized), pre-oxidized AFA, bare SS304 (i.e., not pre-oxidized) and pre-oxidized SS304, as shown in FIGS. 5A and 5B. For these tests, the bare and pre-oxidized AFA samples were fabricated from AFA OC5 alloy (defined above), and the bare and pre-oxidized SS304 samples were fabricated from SS304L alloy (defined above). FIGS. 5A-5B present cathodic polarization curves for the carbon steel and for the AFA OC5 alloy and SS304L alloy with and without pre-oxidation treatments. As shown in FIG. 5A, pre-oxidized SS304L showed lower cathodic current density than the steel and bare (no pre-oxidation) SS304L below −1 $V_{SCE}$. At −1.5 $V_{SCE}$, i.e., only slightly higher than the corrosion potential of AZ31B, the cathodic current density was an order smaller in pre-oxidized SS304L than the others, indicating that pre-oxidation of SS304L effectively reduced the rate of cathodic reaction (dominated by hydrogen evolution). Therefore, Mg anodic dissolution, supported by the cathodic reaction, will be lower when AZ31B is coupled with pre-oxidized SS304L. Referring now to FIG. 5B, a similar trend was observed for pre-oxidized AFA OC5 alloy but with much greater reduction in cathodic current density at −1.5 $V_{SCE}$ (up to three orders of reduction). Based on these results, pre-oxidized AFA will have the lowest cathodic current density among the tested samples, leading to the prediction that a pre-oxidized AFA fastener will be highly effective to mitigate Mg galvanic corrosion. FIG. 6 presents a table summarizing cathodic current density (mA/cm$^2$) at −1.5 $V_{SCE}$ for carbon steel, AFA OC5 alloy before oxidation, pre-oxidized AFA OC5 alloy, SS304L alloy before oxidation and pre-oxidized SS304L alloy measured in FIGS. 5A and 5B.

Figures 7, 8:
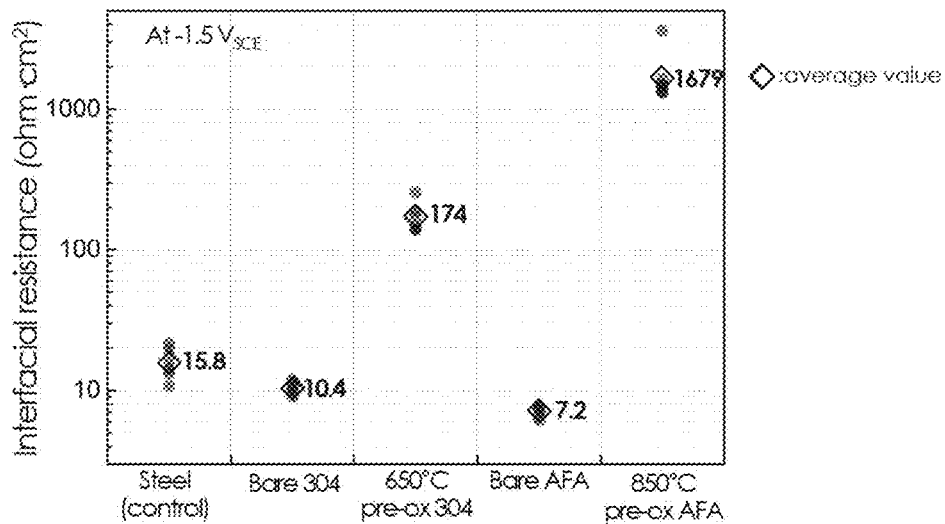
FIG. 7 is a graph comparing interfacial resistance values (resistance against cathodic reaction) for steel, SS304 and AFA.
FIG. 8 is a table presenting a summary of measured mass gain, oxide layer thickness, and electrochemical properties for certain materials before and after thermal oxidation.

The resistance to cathodic reaction (or interfacial resistance) was also determined by electrochemical impedance spectroscopy (EIS) measurement and the impedance spectra fitting. The EIS measurements of steel, bare SS304L, pre-oxidize SS304L, bare AFA OC5 and pre-oxidized AFA OC5 were made at −1.5 $V_{SCE}$ in 0.1 M NaCl at room temperature with the solution open to air. Interfacial resistance is commonly used in the corrosion sciences, and is used to measure the interface between the oxide layer and a corrosive solution. As noted above, interfacial resistance was, in this example, measured at −1.5 $V_{SCE}$ in 0.1 M NaCl solution. The interfacial resistance values for the EIS data at −1.5 $V_{SCE}$ indicate the resistance of alloy surface against cathodic reactions. With a higher interfacial resistance, an alloy will accommodate lower cathodic reaction. The comparison of interfacial resistance values at −1.5 $V_{SCE}$ are presented in FIG. 7. The average interfacial resistance values of pre-oxidized AFA OC5 and SS304L were ×10 and ×100 greater than the values of steel, highlighting the effectiveness of pre-oxidation and AFA in mitigating the cathodic current. Again, reduction in cathodic reaction is beneficial because the coupled anodic dissolution of more active metal (e.g., Mg) can be reduced too. FIG. 8 correlates to FIG. 7 and is a table summarizing the measured mass gain, oxide layer thickness, and electrochemical properties of various materials before and after thermal oxidations under different conditions. It should be noted that different samples of AFA OC5 were pre-oxidized at different temperatures. As shown in the table of FIG. 8, three samples of AFA OC5 HT #2 were heated to 850° C. The three samples of AFA OC5 HT #2 yielded different mass gains as shown in the table. As can be seen, each sample of AFA OC5 HT #2 had significant mass gain and yielded an oxide layer with a thickness in the range of 300 nm to 500 nm. The average interfacial resistance of the three samples is shown in the final column. The average interfacial resistance value for all three AFA OC5 HT #2 samples was 1679, which is approximately 106 times higher than the electrical impedance of the steel rivet and approximately 233 times that of the AFA OC5 sample without oxidation. Similarly, two samples of SS304L HT #2 were heated to 650° C. The different SS304L samples yielded different mass gains as shown in the table. Both samples of SS304L HT #2 had significant mass gain and yielded an oxide layer with a thickness in the range of 200 nm to 450 nm. The average interfacial resistance of the two samples is 174 as shown in the final column. The SS304L HT #2 samples exhibited approximately 17 times higher interfacial resistance than the SS304L sample without oxidation.

Figures 9, 10:
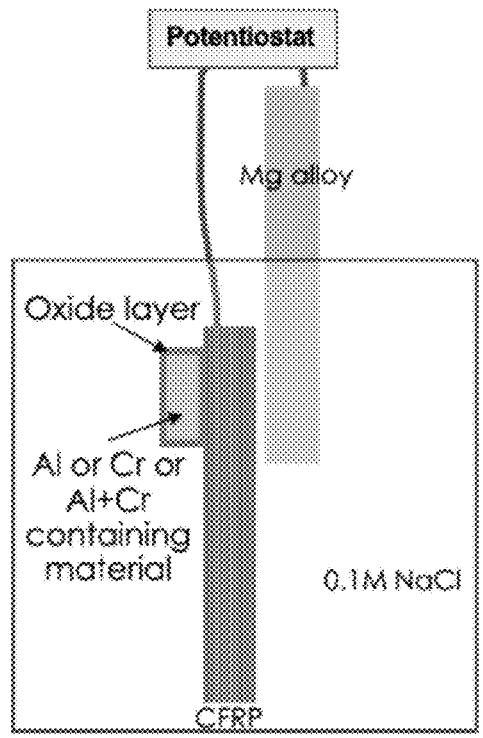
FIG. 9 is schematic representation of a system for galvanic current measurement between Mg alloy and with/without oxide formed material with simulated lap joint configuration.
FIG. 10 is a table summarizing measured galvanic current density for select materials galvanically coupled with AZ31B after 50 hours exposure in 0.1 M NaCl solution.
Figure 11:
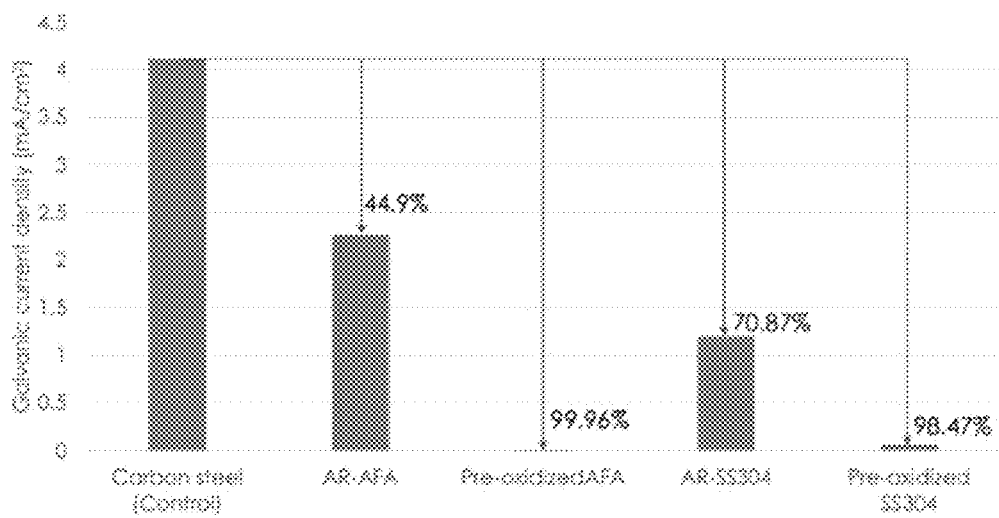
FIG. 11 is a graph comparing measured galvanic current density for select materials galvanically coupled with AZ31B after 50 hours exposure in 0.1 M NaCl solution.

In another exemplary test, a galvanic current density between carbon steel, AFA OC5 alloy, SS304L alloy and AZ31B (Mg alloy) was measured. FIG. 9 is a schematic representation of the system used to measure galvanic current density between Mg alloy, CFRP and select alloys with/without oxide formed material in a simulated lap joint configuration. Galvanic current density between two different materials indicates a degree of galvanic corrosion. That is, the higher it is, the greater galvanic corrosion occurs. The table set forth in FIG. 10 summarizes measured galvanic current densities for the identified materials with different conditions (i.e., before and after oxidation process). The measurements show galvanic current density for the materials galvanically coupled with AZ31B after 50 hours exposure in 0.1 M NaCl solution. As a basis, galvanic current density for the steel rivet was also measured, showing the highest value. For AFA OC5, galvanic current density of 2.27 mA/cm$^2$ was measured without oxidation process, while 0.014 mA/cm$^2$ was measured for pre-oxidized AFA OC5. For high chromium content alloys (e.g., SS304L), galvanic current densities without and with oxidation process were measured to be 1.2 and 0.063 mA/cm$^2$, respectively. It is noted that galvanic current density of AFA OC5 and SS304L without oxidation is lower than the value for the carbon steel rivet. Furthermore, the measured galvanic current density for both AFA OC5 and SS304L after an oxidation process is significantly lower than the value without oxidation process and steel rivet. FIG. 11 compares measured galvanic current density as summarized in the table of FIG. 10. FIG. 11 shows that 99.96% and 98.47% of galvanic current density is reduced for pre-oxidized AFA and SS304 compared with carbon steel (control), respectively. Therefore, this experiment supports the concept that an electrically insulating layer can be formed and can mitigate the galvanic corrosion.

Figure 12:
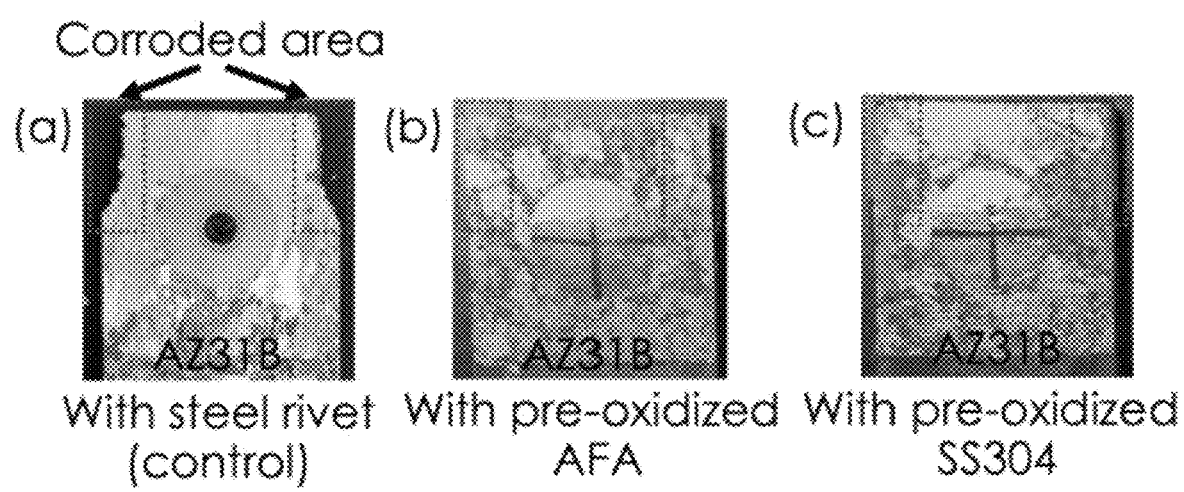
FIG. 12 is a comparison of images of the front side of various samples showing relative corrosion between the samples.

In another test, samples of AZ31B containing F-SPR rivets manufactured from steel, pre-oxidized AFA OC5 and pre-oxidized SS304L were prepared and subjected to immersion testing. FIG. 12 is a comparison of optical images of the different AZ31B samples after 50 hours immersion testing in 0.1 M NaCl solution. In these samples, AZ31B was galvanically coupled with (i) steel rivet (control) (See FIG. 12, Image (a)), (ii) AFA OC5 rivet after oxidation process (See FIG. 12, Image (b)) and (iii) SS304L rivet after oxidation process (See FIG. 12, Image (c)). The AZ31B sheets are 25.4 mm wide. As can be seen, the sample with the steel rivet (control) shows much greater galvanic corrosion than the other two samples that include pre-oxidized AFA OC6 and pre-oxidized SS304L.

Figures 13, 14:
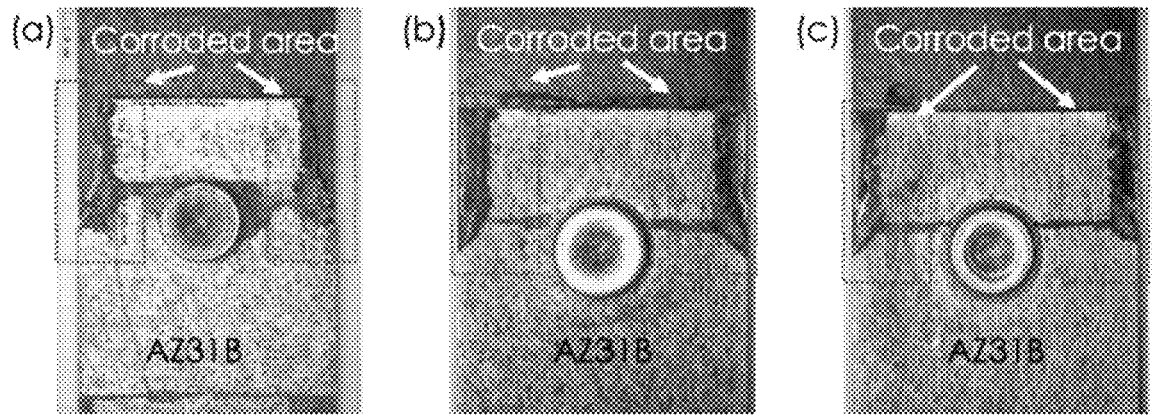
FIG. 13 is a comparison of images of the rear side of the various F-SPR joint samples using carbon steel rivet, pre-oxidized AFA and pre-oxidized SS304, showing relative corrosion between the samples.
FIG. 14 is a table summarizing the measured average corrosion volume of AZ31B and calculated average galvanic current of both sides at F-SPR joints with different rivet materials and coating conditions.

FIG. 13 is a comparison of optical images of the backside of the actual F-SPR joints to join CFRP to AZ31B by the carbon steel, pre-oxidized AFA OC5 and pre-oxidized SS304L rivets. These images were taken after 100 hours immersion testing in 0.1M NaCl solution. The corroded area on AZ31B for each sample is marked with a red dot box. As can be seen, the steel rivet shows more aggressive corrosion of AZ31B than the pre-oxidized AFA OC5 and pre-oxidized SS304L rivets. Based on measurement of the corroded volume of AZ31B, galvanic current of F-SPR joint was reversely calculated using Faraday's law. FIG. 14 is a table summarizing the measured averaged corroded volume of AZ31B and calculated averaged galvanic current of both sides at F-SPR joints with the different rivet materials and coating conditions. As expected, the steel rivet has the higher galvanic current (~4.38 mA), while the other two rivet materials with the pre-oxidation process reveal much lower values. Compared to the control steel rivet, the pre-oxidized AFA OC5 and pre-oxidized SS304L produced 64.2% and 63.8% of galvanic currents, respectively. From the various test, this preliminary corrosion evaluation of F-SPR joints with different rivet materials and coating conditions provides proof that oxidation, such as thermal oxidation, can be used to form oxide layers, such as aluminum oxide and chromium oxide, that are electrically insulating and therefore reduce galvanic corrosion.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, 0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." For the avoidance of doubt, when ranges are presented, including in chemical compositions, the ranges are inclusive of the high and low values defining the range.

On an individual basis, each application for patent, patent, and/or patent application publication, identified herein is expressly incorporated herein by reference in its entirety in one or more non-limiting embodiments.

Any ranges and subranges relied upon in describing various embodiments independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method for forming a pre-oxidized fastener for use in joining dissimilar materials, comprising the steps of:

fabricating a bare fastener from an alloy capable of forming an electrically resistive oxide when subjected to an oxidation process;

following the fabrication step, pre-oxidizing the fastener in an environment containing oxygen to grow a layer of oxide on an exterior surface of the fastener to provide a pre-oxidized fastener, the layer being in an electrically resistive phase and being of sufficient thickness to electrically insulate the pre-oxidized fastener when used in joining dissimilar materials; and wherein the pre-oxidized fastener exhibits a greater interfacial resistance and/or a lower galvanic current than the bare fastener.

2. The method of claim 1 wherein the pre-oxidized fastener exhibits: (i) an interfacial resistance at least 10 times greater than an interfacial resistance exhibited by the bare fastener when measured at $-1.5$ $V_{SCE}$ in a 0.1 M NaCl solution; (ii) a galvanic current at least 50% lower than a galvanic current exhibited by a bare carbon steel fastener of identical geometry to the bare fastener and having a carbon content of 0.18% by weight; or (iii) both (i) and (ii).

3. The method of claim 1 wherein the fabricating step is further defined as fabricating the bare fastener from at least one of an alumina-forming alloy and a chromia-forming alloy.

4. The method of claim 3 wherein the chromia-forming alloy is further defined as a chromia-forming stainless steel containing about 9 to about 30 wt. % Cr.

5. The method of claim 2 wherein the oxide layer has a thickness in the range of about 50 nm to about 1000 nm.

* * * * *